United States Patent [19]

Bloch et al.

[11] Patent Number: 4,545,151

[45] Date of Patent: Oct. 8, 1985

[54] GEAR GRINDING MACHINE INCLUDING A DOUBLE-CONE SHAPED GRINDING WHEEL

[75] Inventors: Peter Bloch, Mutschellen; Meinrad Donner, Nuolen; Roman Schwaighofer, Geroldswil, all of Switzerland

[73] Assignee: Maag Gear-Wheel and Machine Company Limited, Zürich, Switzerland

[21] Appl. No.: 562,083

[22] Filed: Dec. 16, 1983

[30] Foreign Application Priority Data

Dec. 24, 1982 [CH] Switzerland .......................... 7542/82

[51] Int. Cl.$^4$ ............................................ B24B 47/14
[52] U.S. Cl. .................................... 51/52 R; 51/165.9
[58] Field of Search ................ 51/52 R, 34 J, 34 H, 51/50 R, 165.9, 287, 56 G, 95 GH, 105 GG, 123 G

[56] References Cited

U.S. PATENT DOCUMENTS 2,252,743  8/1941  Wildhaber .......................... 51/52 R
4,473,971 10/1984  Mischler et al. .................... 51/165.9

FOREIGN PATENT DOCUMENTS 2029359 12/1971  Fed. Rep. of Germany .
0151128 10/1981  Fed. Rep. of Germany .
3142384  4/1983  Fed. Rep. of Germany .
3213046  7/1983  Fed. Rep. of Germany .

Primary Examiner—Frederick R. Schmidt
Assistant Examiner—Robert A. Rose
Attorney, Agent, or Firm—Werner W. Kleeman

[57] ABSTRACT

The grinding wheel is axially displaceable by means of an axial drive for material removal or cutting operations and tooth flank corrections. The axial drive comprises a double-acting hydraulic piston-cylinder unit, the piston of which is formed at a spindle sleeve of a grinding wheel spindle and the cylinder of which is formed in a carrier or support sleeve. The cylinder is controllable by a servo-valve. A displacement or path measuring device is operatively associated with the spindle sleeve. The servo-valve as well as the displacement or path measuring device are connected to a displacement or path detection circuit which is connected to a program or operating control. There is thus realized a particularly sensitive and precise adjustment for the material removal or cutting operations and the tooth flank corrections.

7 Claims, 2 Drawing Figures

GEAR GRINDING MACHINE INCLUDING A DOUBLE-CONE SHAPED GRINDING WHEEL

CROSS-REFERENCE TO RELATED APPLICATION

This application is related to the commonly assigned, copending U.S. application Ser. No. 06/562,085, filed Dec. 16, 1983, entitled "Profiling Apparatus For a Grinding Wheel in a Gear Grinding Machine".

BACKGROUND OF THE INVENTION

The present invention relates to a new and improved gear grinding machine containing a double-cone shaped grinding wheel.

In its more particular aspects the present invention relates to a new and improved gear grinding machine containing a double-cone shaped grinding wheel and axial drive means for axially displacing the grinding wheel for material removal or cutting operations and for tooth flank corrections.

Such a gear grinding machine as known, for example, from German Patent Publication No. 3,142,384, published Apr. 14, 1983 and the cognate U.S. application Ser. No. 5921/81-4. filed Sept. 14, 1981, differs from the heretofore conventional gear grinding machines in which the grinding wheel is not axially displaceable during operation. It possesses the advantage that only relatively small inert masses must be moved during axial displacement of the grinding wheel. These displacing or adjusting movements, at any rate, during the grinding of large workpieces, can be performed considerably more rapidly and more precisely than corresponding displacements of the workpiece as known, for example from German Pat. No. 2,029,359, granted Dec. 9, 1981 and East German Pat. No. 151,128, published Oct. 8, 1981. In such arrangements larger structural components of the machine which support the workpiece must necessarily participate in such displacements of the workpiece.

SUMMARY OF THE INVENTION

Therefore, with the foregoing in mind it is a primary object of the present invention to provide an improved gear grinding machine containing a double-cone shaped grinding wheel, wherein the grinding wheel can be especially sensitively and precisely displaced in axial direction.

Now in order to implement this and still further objects of the invention, which will become more readily apparent as the description proceeds, the gear grinding machine of the present development is manifested by the features that, the axial drive means comprise a double-acting hydraulic piston-cylinder unit, the piston of which is formed at a spindle sleeve and the cylinder of which is formed at a carrier or support sleeve and is controllable via a servo-valve. A displacement or path measuring device is operatively associated with the spindle sleeve, and the servo-valve as well as the displacement or path measuring device are operatively connected to a displacement or path detection circuit which is connected to a program control.

The hydraulic axial drive means in the gear grinding machine according to the invention affords the advantage over a mechanical axial drive of the grinding wheel that the drive means can be maintained completely free of any axial play without requiring therefor an axial bias as in the case of the mechanical axial drive. Such axial bias is mostly non-uniformly effective in the two directions of axial movement of the grinding wheel, and thus, is detrimental to the precision of the axial displacements.

It is particularly advantageous when the spindle sleeve can be fixedly or solidly clamped in the carrier or support sleeve by hydraulic clamping means. When using such clamping means the spindle sleeve will always be fixedly clamped when a desired axial displacement has been completed. The axial drive means are then completely relieved from the axial forces which occur during the grinding operation, and it is thus ensured that there does not occur any unintentional displacement of the spindle sleeve.

Independently thereof, and preferably in addition thereto, a mechanical clamping device can be operatively associated with the spindle sleeve and which is biased in a predetermined clamping direction by a spring and which is hydraulically held in a released position as long as the hydraulic pressure does not fall short of or below a predetermined hydraulic pressure value. The mechanical clamping device is immediately effective in the event that the hydraulic pressure, due to a fault in the operation of the equipment, falls below a predetermined value which depends upon the bias or pre-bias of the spring. Thus, the spindle sleeve and in conjunction therewith the grinding wheel is secured against unintentional axial displacement even when the hydraulic clamping means can no longer be effective.

Moreover, the clamping device or at least one of the clamping devices is preferably connected in such a manner that the spindle sleeve is fixedly clamped in the presence of any fault or malfunction and not only in the case of failure of the hydraulic pressure. Consequently, for example, the program control is structured such that at least one of the clamping devices is caused to become effective with any non-intended operational state of the gear grinding machine.

When using all those measures as described hereinbefore, a maximum security is achieved against the grinding wheel assuming an unintentional axial position, whereby it may thus damage a workpiece.

BRIEF DESCRIPTION OF THE DRAWINGS

The invention will be better understood and objects other than those set forth above, will become apparent when consideration is given to the following detailed description thereof. Such description makes reference to the annexed drawings wherein through the various figures of the drawings there have been generally used the same reference characters to denote the same or analogous components and wherein.

DETAILED DESCRIPTION OF THE PREFERRED EMBODIMENTS

Figure 1:
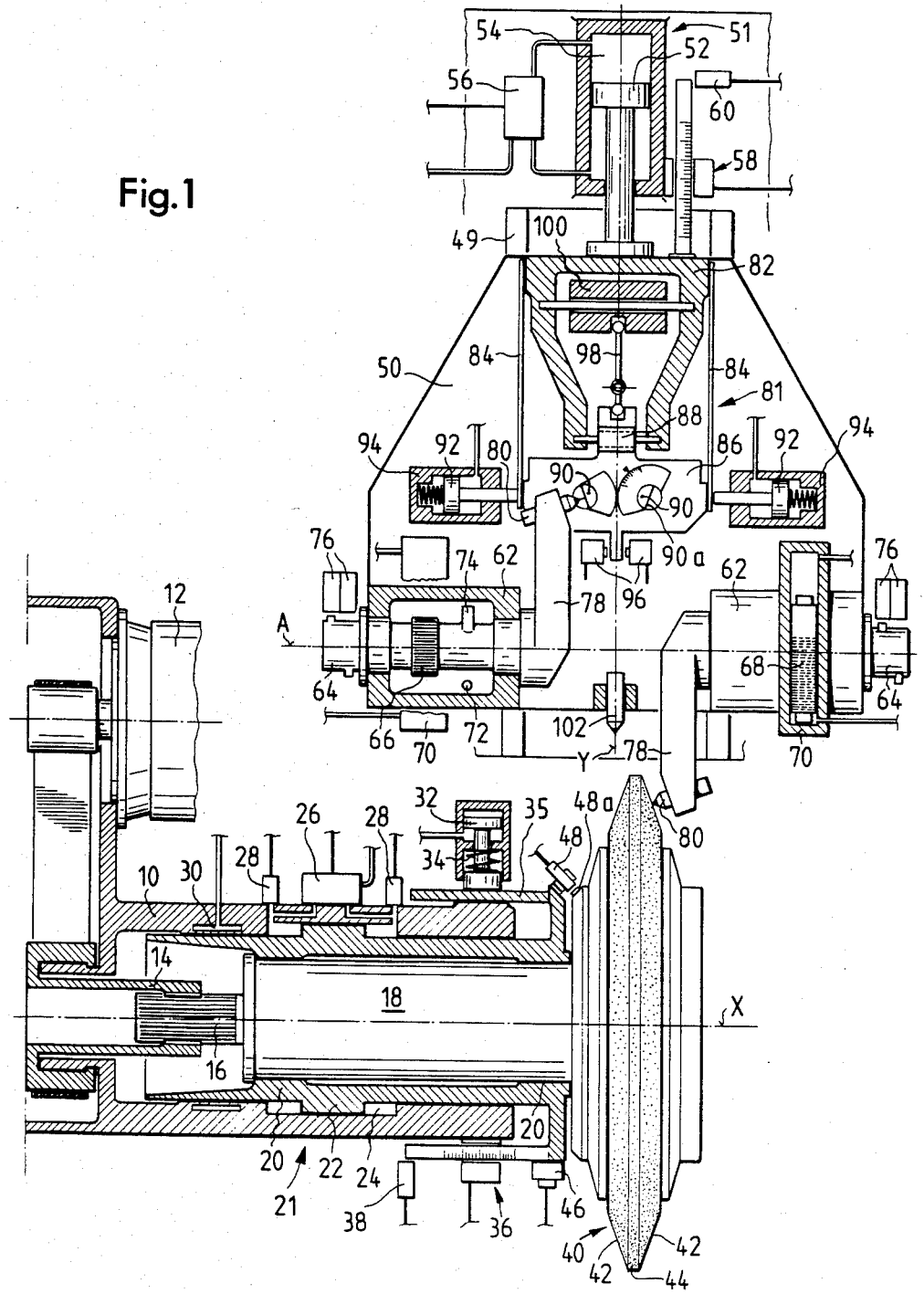
FIG. 1 is an axial section through parts of a gear grinding machine constructed according to the present invention.

Describing now the drawings, it is to be understood that only enough of the construction of the gear grinding machine has been shown as needed for those skilled in the art to readily understand the underlying principles and concepts of the present development, while simplifying the showing of the drawings. Turning attention now specifically to FIG. 1, there have been illustrated therein parts of a gear grinding machine comprising a carrier or support sleeve 10 to which there is flanged or mounted a drive motor 12 which drives a grinding spindle 18 via a hollow shaft 14 which is provided with a multi-grooved profile or splines or the like and engages with a trunnion or journal 16 of the grinding wheel spindle 18 which is axially displaceably received in the hollow shaft 14. The grinding wheel spindle 18 is journalled in a spindle or support sleeve 20 which is axially displaceably guided in the carrier sleeve 10.

Axial drive means 21 are provided to displace the spindle sleeve 20 including the grinding wheel spindle 18. The axial drive means 21 substantially comprises a piston 22 which is formed at the spindle sleeve 20, a double-acting cylinder 24 which is formed at the carrier sleeve 10 and which forms two not particularly referenced chambers or compartments which are separated from each other by the piston 22, and a servo-valve 26 by means of which pressure or pressurized oil is supplied to the cylinder chambers. The pressure in each of the two chambers can be measured by a related pressure gauge or measuring device 28.

By using hydraulic clamping means 30 the spindle sleeve 20 including the grinding wheel spindle 18 can be fixedly clamped in any desired axial position which can be adjusted by the axial drive means 21. A mechanical clamping device 32 is normally held by oil pressure in an inoperative position. In the case of failure of the hydraulic pressure the mechanical clamping device 32 is pressed against a clamping beam or bar 35 mounted at the spindle sleeve 20 by means of a spring 34, in order to thus solidly or fixedly positionally clamp the spindle sleeve 20.

An incremental displacement or path measuring device 36 is constituted by a grating or line grid and by a reader in a manner known as such and is operatively associated with the spindle sleeve 20 and the grinding wheel spindle 18 which is mounted therein for radial and axial displacement. Furthermore, a proximity switch 38 is operatively associated with the spindle sleeve 20 by means of which the zero or null point for the indication of the displacement measuring device 36 can be located or determined each time the operation is started.

At the free end of the grinding wheel spindle 18 there is mounted a grinding wheel 40 which contains two oppositely directed flanks 42 which substantially have the shape of a truncated cone, and a substantially cylindrical surface 44 interconnecting these two cone-shaped flanks 42. During its action upon a workpiece as well as during dressing of either one of the flanks 42 or the cylindrical surface 44 the grinding wheel 40 can be monitored by means of a vibroscope or vibrating meter 46 arranged at the spindle sleeve 20. Furthermore, a proximity switch 48 or equivalent structure is arranged at the spindle sleeve 20 in order to determine the rotational speed of the grinding wheel 40 and cooperates with an appropriate component or part 48a conjointly revolving with the grinding wheel 40.

The grinding wheel 40 can be displaced along a grinding wheel axis X by the axial drive means 21. The grinding wheel axis X forms a rectangular coordinate system together with a vertical center axis Y which extends normally to the grinding wheel axis X. A guide or guide means 49 is stationarily arranged with respect to the gear grinding machine and a radial slide or carriage 50 is disposed above the grinding wheel 40 and is displaceable along the center axis Y at the guide 49.

Controllable radial drive means 51 are provided to displace the radial slide 50. The radial drive means 51 substantially comprise a piston 52 mounted at the radial slide 50, a double-acting cylinder 54 which is stationarily arranged with respect to the gear grinding machine and within which the piston 52 separates two not particularly referenced chambers from each other, and a servo-valve 56 or equivalent structure for controlling the pressure in the two chambers. Furthermore, an incremental displacement or path measuring device 58 is operatively associated with the radial slide 50 and the zero or null point position thereof is determined by means of a proximity switch 60 or equivalent structure.

On the two sides of the center axis Y there is arranged at the radial slide 50 a respective pivot bearing 62 including a shaft 64 journalled therein. The two shafts 64 have a common geometrical axis which is designated as the pivot axis A in the following description, and this pivot axis A extends substantially parallel to the grinding wheel axis X and intersects the center axis Y at right angles.

Within the associated pivot bearing 62 a respective pinion 66 is formed or provided at each one of the two shafts 64. Each of these two pinions 66 meshes with a respective toothed rack 68 which is guided in a double-acting hydraulic cylinder 70 in the manner of a piston such that each one of the shafts 64 can be rotated back and forth through an angle of at least 180°. A pair of adjustable stops or abutments 72 is operatively associated with each one of the shafts 64. The stops or abutments 72 are also arranged within the associated pivot bearing 62 and cooperate with a bolt 74 or the like which is radially threaded into the related shaft 64, in such a manner as to limit the range of rotation of such shaft 64. Furthermore, two proximity switches 76 are operatively associated with each one of two shafts 64 to enable the determination of whether the related shaft 64 has arrived at the one or the other end or terminal position of its rotational range.

A pivot arm or arm member 78 is mounted at each shaft 64 and carries a dressing tool 80. The two dressing tools 80 serve to dress a respective one of the two flanks 42 of the grinding wheel 40 and can be pivoted back-and-forth between an operative or working position and a wear measuring position by rotating the associated shaft 64 by 180°. FIG. 1 shows the right-hand dressing tool 80 in its operative or working position and the left-hand dressing tool 80 in its wear measuring position. The pivoting movements of the two dressing tools 80 are coordinated with each other such that at any given time only one of the two dressing tools 80 assumes its operative position. In each instance each dressing tool 80 assumes its operative or working position prior to that moment of time when the radial slide 50 arrives at the position shown and in which position the relevant dressing tool 80 can contact the associated flank 42 of the grinding wheel 40. This flank 42 is then dressed by coordinated or matched displacements of the grinding wheel 40 along the grinding wheel axis X and the radial slide 50 along its center axis Y.

To be able to determine at any time whether and, if so, to what extent the dressing tools 80 are worn, a wear measuring device 81 is advantageously arranged at the radial slide or slide member 50. A base or socket member 82 which is mounted to the radial slide 50 belongs to the wear measuring device 81 and this base 82 is connected to a bridge member 86 via a pair of leaf springs 84 or equivalent structure. In their rest position as shown the two leaf springs 84 extend substantially parallel to the center axis Y, each intersecting the grinding wheel axis X at substantially right angles. Consequently, the bridge member 86 can be reciprocatingly displaced substantially parallel to the grinding wheel axis X. A plunger or immersion coil 88 is operatively associated with the bridge member 86 in order to measure the displacements thereof.

Two stops or abutments 90 are mounted at the bridge member 86 and each of them contains a stop or impact surface 90a and is operatively associated with a respective one of the dressing tools 80. By rotating each such stop 90 the related stop surface 90a thereof can be adjusted so as to extend at substantially right angles relative to the axis of the associated dressing tool 80. When the dressing tools 80 have been newly installed or readjusted, each dressing tool 80, in its wear measuring position, has a clearness of, for instance, 0.2 mm relative to the associated stop or abutment 90. This clearance increases due to wear of the dressing tools 80. Such clearance increase is added to the axial displacement of the grinding wheel 40 which occurs during the dressing operation.

To ensure that the bridge member 86 assumes the central or intermediate position illustrated in FIG. 1, when one of the dressing tools 80 is pivoted into its wear measuring position, on each side of the bridge member 86 a piston 92 is guided in a related cylinder 94 arranged at the radial slide 50. Each piston 92 is spring loaded such as to tend to prevent a deflection of the bridge member 86 in the direction of the associated cylinder 94. For the measurement of the wear of the one or the other dressing tool 80 the action of the relevant piston 92 on the bridge member 86 can be removed by supplying pressurized oil or another suitable pressurized fluid medium to the associated cylinder 94.

A pair of electromagnets 96 is operatively associated with the bridge member 86 and either one of these two electromagnets 96 can be energized depending upon which one of the two dressing tools 80 is intended to be measured or checked. By energizing the relevant electromagnet 96 the bridge member 86 is displaced in such a manner that the corresponding stop or abutment 90 is pressed against the associated dressing tool 80. The deflection of the bridge member 86 from its central position which thus occurs is measured by means of the plunger or immersion coil 88.

To prevent the measurement described hereinbefore from being negatively affected by any eventual inclined position of the radial slide 50 and weight loads or forces caused thereby which asymmetrically act upon the bridge member 86, the bridge member 86 is connected to a balancing or compensation mass 100 by means of a two-armed lever 98 which is mounted at the radial slide 50. This balancing mass 100 is guided at the base or socket member 82 for reciprocating or to-and-fro movements substantially parallel to the bridge member 86 and in opposition to the displacements of the bridge member 86.

A dressing tool 102 for dressing the, for instance, cylindrical outer or jacket surface 44 of the grinding wheel 40 is arranged at the lower edge of the radial slide 50 essentially on the center axis Y.

Figure 2:
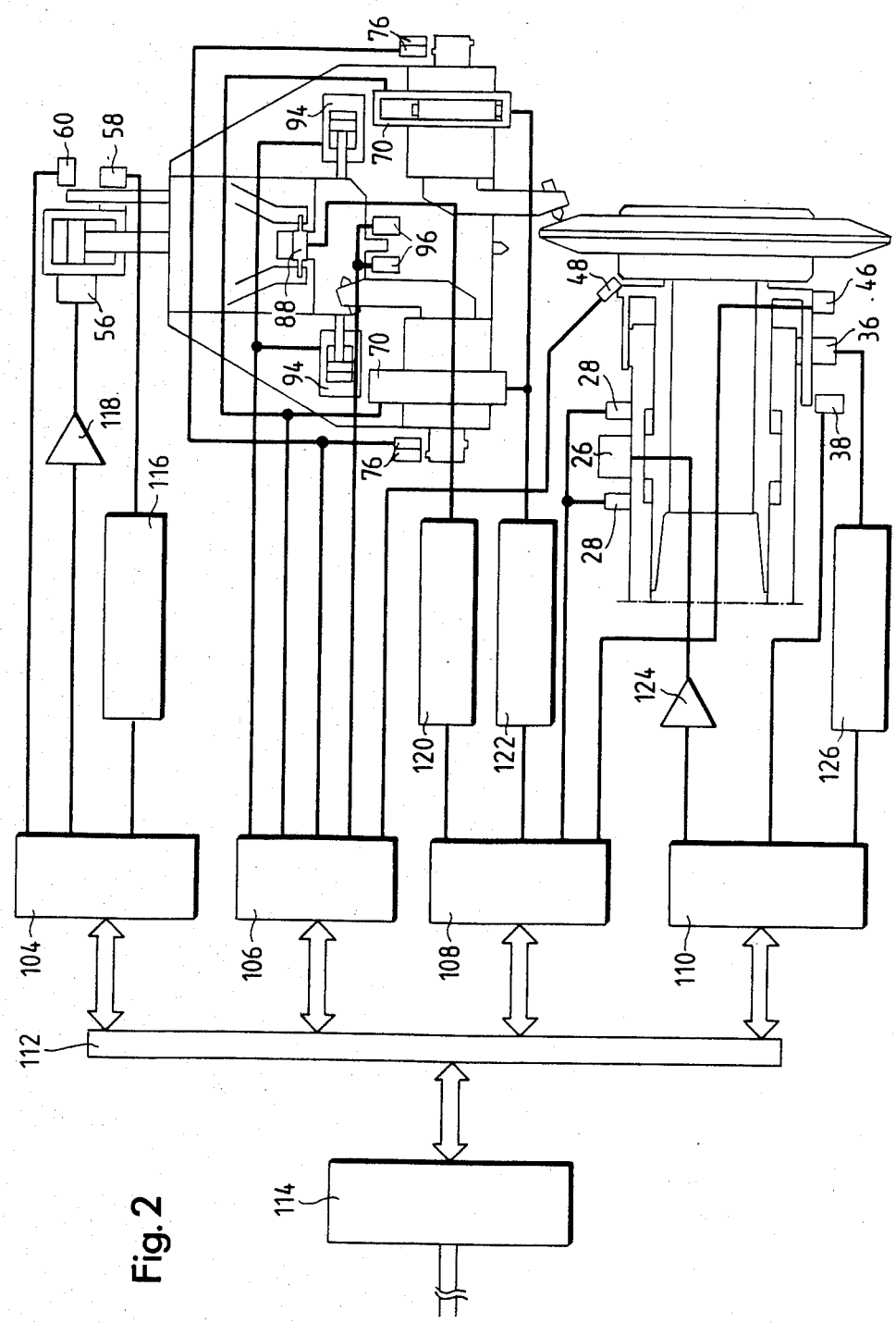
FIG. 2 is a block diagram of a control or control means for the gear grinding machine as shown in FIG. 1.

The drive means and measuring devices described hereinbefore are illustrated with thin lines in FIG. 2 in conjunction with the associated control or control means. The main components of the control comprise a displacement or path detection circuit 104 which is operatively associated with the radial drive means 51 including the displacement or path measuring device 58, a position pick-up circuit 106 which is operatively associated with the mechanical clamping device 32 and with parts of the wear measuring device 81, an A/D- and D/A- converter 108 which is operatively associated with the vibroscope 46, with the axial drive means 21, with the proximity switch 48 as well as with parts of the wear measuring device 81, and a further displacement detection circuit 110, which, above all, is operatively associated with the axial drive means 21. These circuits 104, 106, 108 and 110 are connected to a program or operating control by means of a data bus 112 as, for example, contained in the component ISPX-88/40 commercially available from the well known United States company INTEL Corporation.

The displacement or path detection circuit 104 is known to the art and described in the German Patent Publication No. 3,213,046, to which reference may be had and the disclosure of which is incorporated herein by reference and, therefore, is not here further described in any particular detail. This displacement or path detection circuit 104 is operatively connected to the displacement measuring device 58 via a pulse former or shaper 116 and is further connected to the servovalve 56 via an amplifier 118. Finally, the displacement or path detection circuit 104 is directly connected to the proximity switch 60.

The position pick-up circuit 106 is contained in, for example, the component ICS910 likewise commercially available from INTEL Corporation.

The A/D- and D/A- converter 108 is formed, for example, by the components ISPX-311 and ISPX-328 equally commercially available from INTEL Corporation. This converter 108 is connected to the plunger or immersion coil 88 via circuit 120 and to a proportional valve control 122 for controlling the cylinders 70. Circuit 120 appropriately processes the signals from the plunger coil 88 in such a manner that they can be suitably further processed in analog fashion. The valve control 122 controls the pivoting rate or velocity of the shafts 64.

The displacement or path detection circuit 110 is structured in the same manner as the displacement or path detection circuit 104. This circuit 110 is operatively connected to the servo-valve 26 by means of an amplifier 124 and to the displacement or path measuring device 36 by means of a pulse former or shaper 126.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A gear grinding machine operating with a double-cone shaped grinding wheel, comprising:
   axial drive means for axially displacing said grinding wheel in order to perform material removal operations and tooth flank correcting operations;
   said axial drive means comprising a double-acting hydraulic piston-cylinder unit;
   a grinding wheel spindle for supporting the grinding wheel;
   a spindle sleeve provided for said grinding wheel spindle;

a carrier sleeve cooperating with said spindle sleeve;

said hydraulic piston-cylinder unit comprising a piston provided at said spindle sleeve and a cylinder provided at said carrier sleeve;

a servo-valve controlling said piston-cylinder unit;

a displacement measuring device operatively associated with said spindle sleeve;

a displacement detection circuit;

said servo-valve and said displacement measuring device being connected to said displacement detection circuit; and a program control operatively connected to said displacement detection circuit.

2. The gear grinding machine as defined in claim 1, further including:

hydraulic clamping means for fixedly clamping said spindle sleeve in said carrier sleeve.

3. The gear grinding machine as defined in claim 2, wherein:

said hydraulic clamping means is structured such that said spindle sleeve is fixedly clamped in the presence of any malfunction.

4. The gear grinding mahine as defined in claim 1, further including:

a mechanical clamping device operatively associated with said spindle sleeve;

said mechanical clamping device comprising a spring said mechanical clamping device in a predetermined clamping direction; and hydraulic release means for hydraulically holding said mechanical clamping device in a release position as long as hydraulic pressure does not drop beneath a predetermined hydraulic pressure value.

5. The gear grinding machine as defined in claim 4, wherein:

said mechanical clamping device is structured such that said spindle sleeve is fixedly clamped in the presence of any malfunction.

6. The gear grinding machine as defined in claim 2, further including:

a mechanical clamping device operatively associated with said spindle sleeve;

said mechanical clamping device comprising a spring biasing said mechanical clamping device in a predetermined clamping direction; and hydraulic release means for hydraulically holding said mechanical clamping device in a release position as long as hydraulic pressure does not drop beneath a predetermined hydraulic pressure value.

7. The gear grinding machine as defined in claim 6, wherein:

at least either one of said hydraulic clamping means and said mechanical clamping device is connected such as to fixedly clamp said spindle sleeve in the event of a malfunction.

* * * * *

UNITED STATES PATENT AND TRADEMARK OFFICE
CERTIFICATE OF CORRECTION

PATENT NO. : 4,545,151

DATED : October 8, 1985

INVENTOR(S) : Peter Bloch et al

It is certified that error appears in the above—identified patent and that said Letters Patent is hereby corrected as shown below:

Column 8, line 2, at the beginning of the line please insert --biasing--

Signed and Sealed this

Thirty-first Day of December 1985

[SEAL]

Attest:

Attesting Officer

DONALD J. QUIGG

Commissioner of Patents and Trademarks